United States Patent Office 3,551,489
Patented Dec. 29, 1970

3,551,489
AQUEOUS PROCESS FOR PREPARING PSEUDO-UREAS AND ACID SALTS THEREOF
Frederic Charles Schaefer, Darien, Conn., and William Douglas Zimmermann, New York, N.Y., assignors to American Cyanamid Company, Stamford, Conn., a corporation of Maine
No Drawing. Filed Jan. 16, 1968, Ser. No. 698,122
Int. Cl. C07c *123/00*
U.S. Cl. 260—564                               5 Claims

ABSTRACT OF THE DISCLOSURE

Pseudourea salts of the formula:

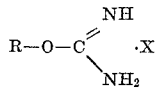

where R is derived from an organic alcohol as defined in (c) below and X is HCl or HBr, are prepared by bringing into contact in an aqueous environment containing substantial amounts of water:
(a) an acid, X, as defined above,
(b) a cyanamide compound and,
(c) a monohydric organic alcohol having at least partial miscibility with water.

BACKGROUND OF THE INVENTION (1) Field of the invention

Pseudoureas, and acid salts thereof, and process for their preparation in aqueous medium.

(2) Description of the prior art

Alkyl pseudourea acid salts of the formula:

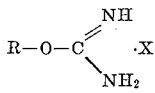

where R may represent a variety of organic groupings and X is a strong inorganic acid such as hydrochloric or hydrobromic are conventionally prepared by reacting an appropriate organic alcohol with cyanamide in the presence of an acid catalyst X, according to the following reaction:

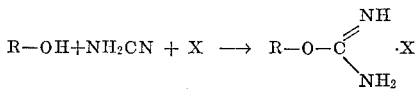

Prior art teachings have continually emphasized the need for carrying out this reaction under strictly anhydrous conditions in order to avoid the hitherto known rapid hydrolysis of cyanamide to urea which occurs in the presence of an aqueous acidic medium. Such hydrolysis consumes cyanamide on an equimolar basis until all of the water is itself consumed. The teaching of the prior art in this regard is amply demonstrated by reference to Organic Synthesis, collective vol. IV, pp. 645–648 (1963) and to a recent publication by Kawano et al. (J. Org. Chem. Soc. Japan, 24 (10), pp. 955–957 (1966)). These two references in calling for anhydrous reactants and anhydrous reaction conditions are merely recent repetitions of what the prior art has urged for years.

The need for anhydrous conditions creates several problems. It necessitates using anhydrous reactants such as, for example, anhydrous cyanamide, anhydrous hydrogen chloride, a frequently used acid catalyst, and anhydrous methanol, a common reactant alcohol. The anhydrous reagents are generally more expensive than their hydrous counterparts. Furthermore, the need for strictly anhydrous reaction conditions and the gaseous state of certain anhydrous reactants create many operational problems in carrying out the reaction all of which increase the cost of producing the pseudourea salts and, consequently, the products prepared from the salts.

SUMMARY OF THE INVENTION

This invention relates to a process for preparing pseudourea acid salts in an aqueous environment. More particularly, it relates to a method of preparing the salts in appreciable yield by reacting a monohydric organic alcohol, a cyanamide compound, and a strongly acidic inorganic acid such as hydrochloric or hydrobromic in an environment containing substantial amounts of water. By "substantial amounts of water" is meant that the reaction mixture contains at least about one mole of water for every mole of cyanamide, an amount of water ordinarily sufficient to hydrolyze all of the cyanamide.

According to the process of this invention, ample yields of pseudourea salts are unexpectedly produced despite the presence in the reaction mixture of sufficient water to hydrolyze all of the cyanamide present therein. Surprisingly, the hydrolysis of cyanamide known to occur in an acidic aqueous medium fails to occur in any appreciable amount when the aqueous acidic medium also contains a monohydric organic alcohol despite the presence of huge molar excesses of water to cyanamide in the reaction mixture. Thus, 80–90% yields of O-methyl pseudourea, for example, are obtainable in reaction mixtures containing as many as 5.8 moles of water per mole of cyanamide. Furthermore, such reaction mixtures contained up to 21% water, clearly indicating that substantial yields of pseudourea salts are obtainable without employing the anhydrous reaction conditions of the prior art.

Pseudourea yields obtainable by the process of this invention are responsive to variations in the mole ratio of reactant alcohol to water. This mole ratio, as used herein, refers to the mole ratio in the aqueous phase of the reaction mixture and not necessarily to the mole ratio in the entire reaction mixture. Generally, product yields will increase as the mole ratio of alcohol to water increases. Suitable results are usually obtainable when mole ratios of about 0.8 or higher are employed, with a range of from about 0.8 to about 3 representing preferred mole ratio values.

An aqueous reaction environment may arise in a variety of ways such as, for example, by the use of aqueous acid solutions or aqueous cyanamide solutions as reactants. The water content of the reaction environment may rise to appreciable levels in the practice of the invention without significant adverse effect on product yields or cyanamide hydrolysis provided the mole ratio of alcohol to water is properly adjusted to compensate for the water content of the aqueous phase of the reaction mixture.

It is therefore an object of this invention to provide a process to produce pseudourea acid salts in appreciable yields by the acid catalyzed reaction of a cyanamide compound and a monohydric organic alcohol in a reaction environment containing substantial amounts of water.

It is another object of this invention to eliminate the expensive anhydrous reactants ordinarily employed to synthesize pseudourea salts and further to eliminate processing difficulties arising from the hitherto required use of anhydrous reactants and strictly anhydrous process conditions.

It is a still further object of this invention to reduce the manufacturing cost of pseudourea salts and correspondingly the manufacturing cost of various products for which the salts are suitable intermediates.

These and other objects of this invention will become apparent from a total reading of this specification.

DESCRIPTION OF THE PREFERRED EMBODIMENT

Since product yields according to the inventive process may be increased by increasing the alcohol to water mole ratio, it becomes important to retain appreciable amounts of alcohol in the aqueous phase of the reaction mixture. The more miscible an alcohol is with water, the greater the ratio of alcohol to water obtainable in the aqueous phase. To this end, it is highly preferred in carrying out the process of this invention to employ alcohols of high miscibility with water such as allyl alcohol and alkanols containing from one to three carbon atoms such as, for example, methanol, ethanol, n-propanol, isopropanol. Methanol is a particularly suitable alcohol. When such miscible alcohols are used, the higher alcohol to water ratios ordinarily conducive to high product yields are readily obtained. Other alcohols which are less miscible than those mentioned above or which are only partially miscible with water are, of course, included within the scope of the invention provided their miscibility with water is sufficent to achieve a suitable alcohol to water ratio.

Although increasing the mole ratio of alcohol to water increases the yield of pseudourea salt, it is preferable from a practical viewpoint to employ the minimal amount of alcohol required to produce the desired yield of pseudourea salt. For example, there are limitations on higher ratio values dictated by such considerations as reactor size and alcohol recovery costs. It is difficult to precisely fix a range of operable mole ratios of alcohol to water since the ratio will vary depending on a variety of factors such as the particular alcohol employed, the nature of the acid, the desired yield and economic factors. However, best results are generally obtained when alcohol to water mole ratios of at least about 0.8 are employed. To reduce the amount of alcohol required to maintain the desired ratio value, it is often desirable when adding the acid and cyanamide as aqueous solutions to use as highly concentrated solutions as possible.

It is convenient to use at least one mole of cyanamide for each mole of acid with a slight excess of cyanamide preferred. The excess assures substantially complete usage of the acid in the pseudourea salt, leaving no acid available to form an acid salt of any urea which may be produced in minor amounts from reaction of the cyanamide and water. Certain urea acid salts such as urea hydrochloride are difficult to separate from the pseudourea salt product and the prevention of their formation is an advantage. The excess cyanamide also compensates for minor amounts of cyanamide which may hydrolyze.

Cyanamide, $H_2NCN$, is the preferred cyanamide compound, but alkali metal or alkaline earth metal salts of cyanamide may also be employed alone or in admixture of two or more. Among such salts may be mentioned the sodium, potassium, or calcium salts such as $CaNCN$, $Ca(HNCN)_2$, $NaHNCN$, or $Na_2NCN$. When a salt such as $CaNCN$ is employed in place of cyanamide, three moles of a mono basic reactive acid such as hydrochloric or hydrobromic will be required to provide an equivalent of the acid for reaction with the cyanamide compound since two moles of the acid will be consumed in the neutralization of the cyanamide salt. In similar fashion, two moles of acid will be required when $NaHNCN$ is employed.

Reaction pressure and temperature are not considered to be critical. A temperature range of about 20–100° C. is quite suitable with temperatures of about 70–95° C. and atmospheric pressure representing preferred reaction conditions. The pseudourea acid salts may be readily converted to the corresponding pseudourea by reaction with a suitable base such as sodium hydroxide, potassium hydroxide, or the like using known techniques.

Pseudoureas and their acid salts are well known intermediates for preparing a host of substituted s-triazines according to the teachings of U.S. Pat. 3,203,550. The s-triazines are useful as agricultural biocides, surface active compounds, dye intermediates, pharmaceutical intermediates, and the like, as pointed out in the above cited patent. The pseudoureas find further utility as intermediates in the preparation of herbicidally active acyl derivatives of pseudoureas according to the teaching of U.S. Pat. 2,780,535. The pseudoureas are also used as intermediates in the synthesis of certain useful pyrimidines as shown in U.S. Pat. 2,779,669.

The following nonlimiting examples are provided to further illustrate the invention.

EXAMPLE 1

Preparation of O-methyl pseudourea hydrochloride

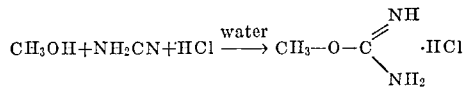

Concentrated hydrochloric acid (83.3 ml. 12 N acid; 1.0 mole) is added in 15–30 minutes to a solution of 1.0 mole of 50% aqueous cyanamide (84 g.) in 400 ml. of methanol (9.87 moles). The reaction mixture now contains 20.9% water (5.8 moles). The temperature rises spontaneously to near the boiling point during this addition. The solution is held an additional 30 minutes at about 70° C.; it is then evaporated essentially to dryness at reduced pressure and at temperatures below 50° C. The largely crystallized residue is extracted with a small amount of acetone which leaves substantially pure O-methylpseudourea hydrochloride undissolved, melting point 114° C. Yield, 80%.

If the water concentration in the reaction mixture of the preceding example is reduced from 20.9% (5.8 moles) to 13.7% (3.47 moles) by using 100% cyanamide instead of a 50% aqueous cyanamide solution, the average yield is increased to 90%.

EXAMPLES 2 THROUGH 5

Following the general procedure of Example 1, a variety of pseudourea salts was prepared using hydrochloric acid as the catalyst and different alcohols and reaction conditions. Upon completion of the reaction, the solution is evaporated to leave a crude syrup. Aqueous sodium picrate solution is added to the syrup at room temperature with agitation to precipitate the picrate salt of the pseudourea. The salt is then filtered and washed. Results are summarized in Table 1.

TABLE 1

| Example: | Alcohol | Cyanamide | Temp., °C. | Percent water in reaction mixture | Moles alcohol/ moles cyanamide | Moles alcohol/ moles water | Product, hydrochloride salt of | Yield, percent | Melting point[1], °C. |
|---|---|---|---|---|---|---|---|---|---|
| 2 | Isopropyl | 100% | 85 | 13.7 | 5.2 | 1.5 | O-isopropyl pseudourea | 38 | 149–150 |
| 3 | Isopropyl | 50% aqueous solution | 85 | 21 | 5.2 | 1.1 | do | 29 | 149–150 |
| 4 | n-Propyl | 50% aqueous solution | 95 | 21 | 5.36 | .93 | O-n-propyl pseudourea | 57 | 158–160 |
| 5 | Allyl | 50% aqueous solution | 85 | 20 | 5.9 | 1.02 | O-allyl pseudourea | 25 | 158–160 |

[1] Of picrate salt.

We claim:
1. A process for preparing pseudourea salts of the formula:

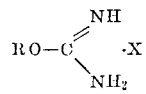

wherein R is selected from the group consisting of alkyl containing from one to three carbon atoms and allyl and X is an acid as defined below, which comprises bringing into contact:
  (a) an acid, X, selected from the group consisting of hydrochloric and hydrobromic;
  (b) a cyanamide compound selected from the group consisting of cyanamide, alkali metal salts of cyanamide, and alkaline earth metal salts of cyanamide;
  (c) water in amount sufficient to provide at least one mole of water for each mole of cyanamide in solution; and
  (d) a monhydric organic alcohol of the formula ROH wherein R is defined above.

2. The process of claim 1 wherein the mole ratio of alcohol to water in the aqueous phase of the reaction mixture is about 0.8 to about 3.

3. The process of claim 2 wherein at least about one mole of cyanamide ($H_2NCN$) is used per mole of acid used.

4. The process of claim 1 wherein the acid is hydrochloric.

5. The process of claim 4 wherein the alcohol is methanol.

References Cited

UNITED STATES PATENTS

| | | | |
|---|---|---|---|
| 2,039,514 | 5/1936 | Battegay | 260—125 |
| 2,849,306 | 8/1958 | Searle | 71—2.6 |

OTHER REFERENCES

Migrdichian, Organic Synthesis, vol I, pp. 436–37 (1957).

BERNARD HELFIN, Primary Examiner

G. A. SCHWARTZ, Assistant Examiner